(12) United States Patent
Cao et al.

(10) Patent No.: US 9,116,052 B2
(45) Date of Patent: Aug. 25, 2015

(54) TEMPERATURE MEASURING DEVICES AND RELATED METHODS

(75) Inventors: Liang Cao, Xi'an (CN); Wei Wu, Xi'an (CN)

(73) Assignee: Emerson Electric Co., St. Louis, MO (US)

( * ) Notice: Subject to any disclaimer, the term of this patent is extended or adjusted under 35 U.S.C. 154(b) by 156 days.

(21) Appl. No.: 13/399,171

(22) Filed: Feb. 17, 2012

(65) Prior Publication Data

US 2013/0128922 A1 May 23, 2013

(30) Foreign Application Priority Data

Nov. 23, 2011 (CN) .......................... 2011 2 0469452

(51) Int. Cl.
*G01K 7/00* (2006.01)
*G01K 7/22* (2006.01)

(52) U.S. Cl.
CPC ... *G01K 7/22* (2013.01); *G01K 7/00* (2013.01)

(58) Field of Classification Search
CPC ............................. H01L 23/34; H03M 1/1071
USPC ............................. 374/169–174; 341/120, 140
See application file for complete search history.

(56) References Cited

U.S. PATENT DOCUMENTS

| | | | |
|---|---|---|---|
| 4,536,851 A * | 8/1985 | Germanton et al. ........... | 702/131 |
| 5,024,535 A * | 6/1991 | Winston, Jr. ................... | 374/178 |
| 5,085,526 A * | 2/1992 | Sawtell et al. ................. | 374/101 |
| 6,763,710 B2 | 7/2004 | Mayer et al. | |
| 7,081,816 B2 | 7/2006 | Schebel et al. | |
| 7,372,448 B2 * | 5/2008 | Kim .............................. | 345/106 |
| 7,410,293 B1 * | 8/2008 | Santurkar et al. ............. | 374/178 |
| 7,490,511 B2 * | 2/2009 | Mayer et al. ................ | 73/204.15 |
| 7,497,615 B2 * | 3/2009 | Kim et al. ...................... | 374/170 |
| 7,661,878 B1 * | 2/2010 | Lall et al. ....................... | 374/170 |
| 7,674,035 B2 * | 3/2010 | Pertijs et al. ...................... | 374/1 |
| 2004/0105488 A1 * | 6/2004 | Felder ........................... | 374/170 |
| 2006/0018364 A1 * | 1/2006 | Kim et al. ...................... | 374/183 |
| 2006/0267668 A1 * | 11/2006 | Porter ........................... | 327/512 |
| 2008/0259998 A1 * | 10/2008 | Venkataraman et al. ..... | 374/170 |
| 2009/0073019 A1 * | 3/2009 | Ooi ............................... | 341/158 |
| 2009/0141770 A1 * | 6/2009 | Chen et al. .................... | 374/170 |
| 2010/0124251 A1 * | 5/2010 | Peterson et al. .............. | 374/171 |

OTHER PUBLICATIONS

"MSP430 Slope A/D Converters are Inexpensive and Accurate", John Fahrenbruch; Feb. 20, 2007; pp. 1-5.

* cited by examiner

*Primary Examiner* — Lisa Caputo
*Assistant Examiner* — Nasir U Ahmed
(74) *Attorney, Agent, or Firm* — Harness, Dickey & Pierce, P.L.C.

(57) ABSTRACT

Exemplary embodiments are disclosed herein of temperature measuring devices. In an exemplary embodiment, a temperature measuring device includes a temperature sensing means, at least two reference voltage sources, and a reference voltage selection means for selecting one reference voltage source from the at least two reference voltage sources to generate a reference voltage output. The temperature measuring device also includes an A/D converter for converting an analog signal output by the temperature sensing means to a digital signal based on the reference voltage output. The temperature measuring device further includes a temperature calculation means for calculating a temperature to be measured based on the digital signal output by the A/D converter.

22 Claims, 3 Drawing Sheets

TEMPERATURE MEASURING DEVICES AND RELATED METHODS

CROSS-REFERENCE TO RELATED APPLICATION

This application claims the benefit and priority of Chinese Utility Model Application No. 201120469452.6 filed Nov. 23, 2011. The entire disclosure of the above application is incorporated herein by reference.

FIELD

The present disclosure relates to temperature measuring devices and related methods in which an analog-to-digital (A/D) converter is used, which may have a high temperature resolution in a wide measurement range.

BACKGROUND

This section provides background information related to the present disclosure which is not necessarily prior art.

Temperature measuring devices are widely used in various fields, such as a clinical thermometer for measuring body temperature, a temperature measuring device in a temperature controller, etc. In order to achieve better performance of temperature controlling when using a temperature controller, the temperature measuring device therein should have a high temperature resolution in a wide measurement range.

In the past, in order to achieve a high temperature resolution, A/D converters were not used to measure temperature. This is because a temperature measuring device utilizing an A/D converter was too costly and was unable to keep the high temperature resolution in a wide measurement range. But with the development of hardware technologies, the cost of a temperature measuring device utilizing an A/D converter has been decreased to a more affordable level. In some special applications, such as in a temperature controller, a temperature measuring device utilizing A/D converter has become the preferred choice for temperature measurement because of the short time of the measurement and other advantages associated with utilization of an A/D converter.

Presently, however, a temperature measuring device utilizing an A/D converter provides only one reference voltage for the A/D converter therein. But the reference voltage for a certain A/D converter generally corresponds to the measurement range of the temperature measuring device. In order to achieve a wide measurement range, it is common to choose a large reference voltage for the A/D converter. But the larger the reference voltage is, the lower the temperature resolution is for the temperature measuring device. And, in case of utilizing one reference voltage, the resolution of the A/D converter is invariable. As a result, the resolution of the temperature measuring device decreases as the temperature increases, and it becomes unable to meet the requirement of certain temperature controllers. In addition to recognizing the above, the inventors hereof have further recognized a need for a temperature measuring device utilizing an A/D converter, which has a high temperature resolution in a wide measurement range.

SUMMARY

This section provides a general summary of the disclosure, and is not a comprehensive disclosure of its full scope or all of its features.

Exemplary embodiments are disclosed herein of temperature measuring devices. In an exemplary embodiment, a temperature measuring device includes a temperature sensing means, at least two reference voltage sources, and a reference voltage selection means for selecting one reference voltage source from the at least two reference voltage sources to generate a reference voltage output. The temperature measuring device also includes an A/D converter for converting an analog signal output by the temperature sensing means to a digital signal based on the reference voltage output. The temperature measuring device further includes a temperature calculation means for calculating a temperature to be measured based on the digital signal output by the A/D converter.

An exemplary embodiment of a temperature measuring device includes means for converting a sensed temperature to an analog signal. The temperature measuring device also includes means for selecting one reference voltage source from at least two reference voltage sources to generate a reference voltage output. The temperature measuring device further includes means for converting the analog signal to a digital signal based on the reference voltage output. The temperature measuring device also includes means for calculating a temperature to be measured based on the digital signal.

Also disclosed herein are exemplary methods relating to measuring temperature or temperature measurement. In an exemplary embodiment, a method generally includes converting a sensed temperature to an analog signal, selecting one reference voltage source from at least two reference voltage sources to generate a reference voltage output, converting the analog signal to a digital signal based on the reference voltage output, and calculating a temperature to be measured based on the digital signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
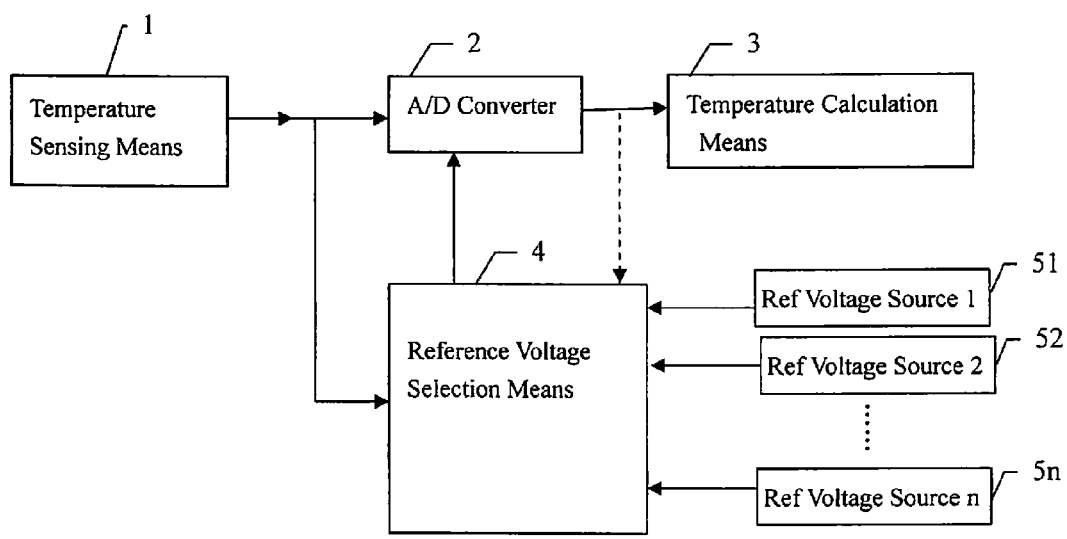
FIG. 1 is a block diagram which schematically illustrates the structure of a temperature measuring device according to an exemplary embodiment.

Example embodiments will now be described more fully with reference to the accompanying drawings.

Exemplary embodiments are disclosed herein of temperature measuring devices and related methods in which A/D converters are utilized, which may have a high temperature resolution in a wide measurement range. As disclosed herein, temperature measurement resolution may be improved by altering A/D converter reference voltage. In exemplary embodiments, a temperature measuring device utilizes A/D converter, which can keep a relatively high temperature resolution in a relatively wide measurement range.

As disclosed herein for exemplary embodiments, a temperature measuring device includes a temperature sensing means (e.g., 1, etc.), at least two reference voltage sources (e.g., 51, 52, . . . , 5n, etc.), and a reference voltage selection means (e.g., 4, etc.) operable for selecting one reference voltage source from the at least two reference voltage sources to generate a reference voltage output. The temperature measuring device also includes an A/D converter (e.g., 2, etc.) operable for converting an analog signal output by or from the temperature sensing means to a digital signal based on the reference voltage output generated by or from the reference voltage selection means. The temperature measuring device further includes a temperature calculation means (e.g., 3, etc.) operable for calculating a temperature to be measured based on the digital signal output by the or from A/D converter. In this example, the temperature measuring device utilizing the A/D converter may achieve a fast measuring speed and have a high temperature resolution in a relatively wide measurement range.

Each of the at least two reference voltage sources generates a reference voltage different from the reference voltage generated by any other reference voltage source.

The reference voltage selection means selects one of the reference voltage sources based on the analog signal output by or from the temperature sensing means. The reference voltage selection means selects the reference voltage source based on the voltage of the analog signal. The reference voltage selection means selects one of the reference voltage sources based on the relationship between the voltage of the analog signal and the reference voltages generated by the at least two reference voltage sources. Generally, the smaller the voltage of the analog signal output by or from the temperature sensing means is, the smaller the reference voltage will be that is selected by the reference voltage selection means.

In an alternative exemplary embodiment, the reference voltage selection means selects the one reference voltage source based on the digital signal output by or from the A/D converter. The reference voltage selection means selects the one reference voltage source based on the numerical value represented by the digital signal. Generally, the smaller the numerical value represented by the digital signal is, the smaller the reference voltage will be that is selected by the reference voltage selection means.

In an exemplary embodiment, the at least two reference voltage sources, the reference voltage selection means, the A/D converter, and the temperature calculation means may be integrated into a converting device.

In another exemplary embodiment, at least one reference voltage source of the at least two reference voltage sources, the reference voltage selection means, the A/D converter, and the temperature calculation means may be integrated into a converting device. Further, the remaining reference voltage sources can be provided outside the converting device in this exemplary embodiment.

In yet another exemplary embodiment, the reference voltage selection means, the A/D converter, and the temperature calculation means may be integrated into a converting device. Further, the at least two reference voltage sources are provided outside the converting device in this exemplary embodiment.

In exemplary embodiments of the temperature measuring device, the temperature sensing means includes a temperature sensor and a signal processing and output means (e.g., voltage output) connected with the temperature sensor. The output port of the signal processing and output means is connected to the input port of the A/D converter. By way of example, the temperature sensor may be a thermistor, and the signal processing and output means may be a voltage division circuit.

An exemplary embodiment of a temperature measuring device provided in accordance with aspects of the present disclosure may keep a high temperature resolution in a wide measurement range. The temperature measuring device may also have a fast temperature measuring speed, and be relatively low cost.

With reference now to the figures, FIG. 1 is a block diagram which schematically illustrates the structure of a temperature measuring device according to an exemplary embodiment. As shown, the temperature measuring device includes a temperature sensing means 1, at least two reference voltage sources 51, 52, . . . , 5n, and a reference voltage selection means 4 operable for selecting one reference voltage source from the at least two reference voltage sources 51, 52, . . . , 5n to generate a reference voltage output.

The temperature measuring device also includes an A/D converter 2 operable for converting an analog signal output by or from the temperature sensing means 1 to a digital signal based on the reference voltage output from the reference voltage selection means 4. The temperature measuring device further includes a temperature calculation means 3 operable for calculating a temperature to be measured based on the digital signal output by or from the A/D converter 2.

The temperature sensing means 1 converts the sensed temperature to a corresponding analog signal and outputs the analog signal to the input port of the A/D converter 2. Additionally, or alternatively, the temperature sensing means 1 may also output the analog signal to the reference voltage selection means 4.

By way of example, the temperature sensing means 1 may comprise a temperature sensor and a signal processing and output means connected with the temperature sensor. The temperature sensor may be any type of temperature sensor available in the market. The temperature sensor converts the sensed temperature to a certain electrical parameter, such as a resistance value. Then, the signal processing and output means converts the electrical parameter to an analog signal. In an exemplary embodiment, the temperature sensing means 1 may be a voltage division circuit including a thermistor, such as a circuit disclosed in the U.S. Pat. No. 7,081,816 and incorporated herein by reference. The thermistor converts the temperature to a corresponding resistance value, and the voltage division circuit comprising the thermistor converts the resistance value to a corresponding voltage value.

Each of the at least two reference voltage sources 51, 52, . . . , 5n may generate a reference voltage different from the reference voltage generated by any other reference voltage source. The input voltage of an A/D converter generally should not exceed its reference voltage, that is, the reference voltage of an A/D converter corresponding to its maximum input voltage. Therefore, the measurable range of the measuring device utilizing an A/D converter is generally limited by the reference voltage of the A/D converter.

In another aspect, the resolution of an A/D converter is related to its reference voltage. The larger the reference voltage is, the lower the resolution is, resulting in the lower resolution of the measuring device. Therefore, in order to achieve higher resolution, a smaller reference voltage may be chosen. But the smaller reference voltage may narrow the measurable range of the measuring device. The traditional measuring device utilizing an A/D converter only provides one reference voltage for the A/D converter, which cannot achieve both a relatively large measurement range and a relatively high resolution at the same time. To resolve this technical problem, the inventors hereof have provided at least two different reference voltages for the A/D converter. A reference voltage is selected correspondingly based on the input voltage or the converted digital signal of the A/D converter, which selected reference voltage is output to the A/D converter. Preferably, a larger reference voltage may be used when the input voltage of the A/D converter is larger, whereas a smaller reference voltage may preferably be used when the input voltage of the A/D converter is smaller. Alternatively, a larger reference voltage may be used when the value represented by the digital signal output by or from the A/D converter is larger, whereas a smaller reference voltage may be used when the value represented by the digital signal output by or from the A/D converter is smaller. Accordingly, the inventors' exemplary embodiments of temperature measuring devices disclosed herein may not only achieve a wide measurement range because the A/D converter can have a larger input voltage, but may also achieve a high resolution by using a smaller reference voltage when the input voltage of the A/D converter is smaller. As a result, the inventors' disclosed temperature measuring devices can achieve a high measurement resolution in a wide measurement range.

With continued reference to FIG. 1, the reference voltage selection means 4 receives the analog signal from the temperature sensing means 1, and selects one reference voltage source from the at least two reference voltage source 51, 52, . . . , 5n based on the analog signal so as to generate a reference voltage output, i.e., outputting the reference voltage generated by the selected reference voltage source to the A/D converter 2 as its reference voltage. As shown in FIG. 1, the input port of the reference voltage selection means 4 may be connected to the at least two reference voltage sources so as to receive the reference voltages generated by them. The selection basis port of the reference voltage selection means 4 may be connected to the output port of the temperature sensing means 1 to receive the analog signal from the temperature sensing means 1. The output port of the reference voltage selection means 4 may be connected to the reference voltage input port of the A/D converter 2 so as to output the reference voltage generated by the selected reference voltage source to the A/D converter 2.

The reference voltage selection means 4 may select the reference voltage source based on the voltage of the analog signal. Preferably, the reference voltage selection means 4 may select the reference voltage based on the relationship between the voltage of the analog signal and the reference voltages generated by the at least two reference voltage sources. For example, the larger the voltage of the analog signal is, the larger the reference voltage will be that is selected; whereas the smaller the voltage of the analog signal is, the smaller the reference voltage will be that is selected.

Alternatively, the reference voltage selection means 4 may receive the digital signal output by or from the A/D converter 2, and select one reference voltage source based on the digital signal. In this case, as shown by the dashed arrow in FIG. 1, the selection basis port of the reference voltage selection means 4 may be connected to the output port of the A/D converter 2 to receive the digital signal output by or from the A/D converter 2. In this situation, the reference voltage selection means 4 may select the reference voltage source based on the value represented by the digital signal. For example, the larger the value represented by the digital signal is, the larger reference voltage is selected; whereas the smaller the value represented by the digital signal is, the smaller reference voltage is selected.

By way of example only, the process by which the reference voltage selection means 4 selects the reference voltage for the A/D converter 2 based on the analog signal from the temperature sensing means 1 is explained hereinafter. In the example, the at least two reference voltage sources 51, 52, . . . , 5n generate a first reference voltage and a second reference voltage smaller than the first reference voltage. If the voltage of the analog signal is higher than a certain proportion (e.g., 50%, etc.) of the first reference voltage, the reference voltage selection means 4 will select and continue to use the first reference voltage (e.g., 2.5V, etc.). If the voltage of the analog signal is less than said proportion (e.g., 50%. etc.) of the first reference voltage, the reference voltage selection means 4 will select the second reference voltage (e.g., 1.5V, etc.). Further, in case the reference voltage selection means 4 selects the second reference voltage, if the voltage of the analog signal is less than a certain proportion (e.g., 90%, etc.) of the second reference voltage, the second reference voltage will be still selected and continue to be used. Otherwise, if the voltage of the analog signal is larger than said proportion (e.g., 90%, etc.) of the second reference voltage, the first reference voltage will then be selected. The aforesaid proportions are put forward only as non-limiting examples, and should not be construed to limit the scope of the disclosure.

The reference voltage selection means 4 may be implemented by way of software or hardware, such as a comparator, etc. In an exemplary embodiment, the reference voltage selection means 4 is implemented by a software module running in a microcontroller.

The A/D converter 2 converts the analog signal to a corresponding digital signal based on the reference voltage selected by the reference voltage selection means 4. The A/D converter 2 may be any type of A/D converter, such as a successive-approximation ADC, a delta-encoded ADC, or a sigma-delta converter, etc.

The temperature calculation means 3 is connected to the output port of the A/D converter 2, and works out the temperature according to the digital signal output by or from the A/D converter 2. The temperature calculation means 3 may be implemented by means of software or hardware. Additionally, or alternatively, the temperature calculation means 3 may utilize a map table in a microcontroller to map the digital signal that is output by or from the A/D converter 2 into a value of the temperature. Further, the temperature calculation means 3 may also work out the value of the temperature by utilizing a formula. The implementation of the temperature calculation means 3 is not limited to aforesaid ways.

Figure 2:
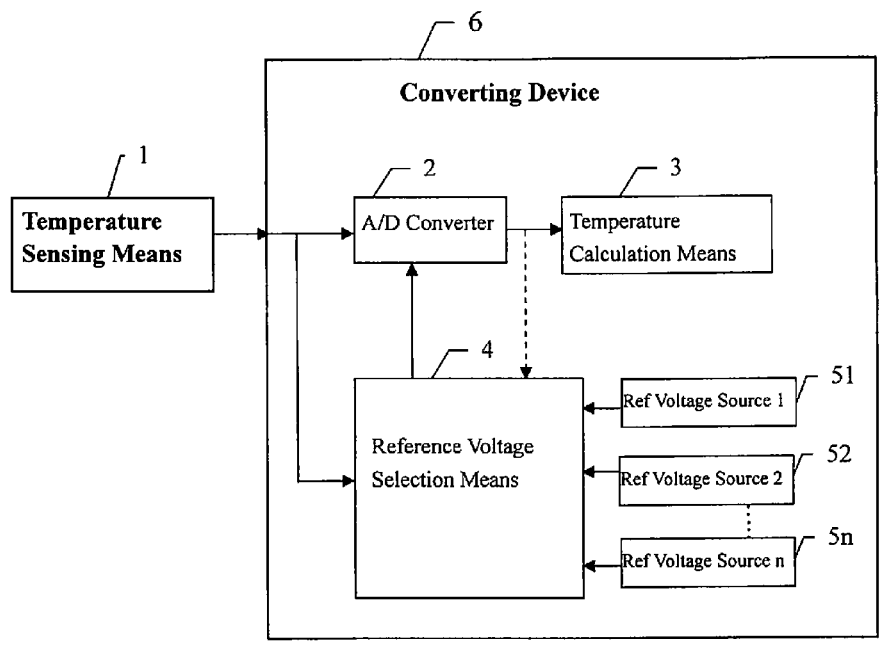
FIG. 2 is a block diagram which schematically illustrates the structure of a temperature measuring device according to another exemplary embodiment.

FIG. 2 illustrates an exemplary embodiment in which the at least two reference voltage sources 51, 52, . . . , 5n, the reference voltage selection means 4, the A/D converter 2, and the temperature calculation means 3 may be integrated into a converting means or device 6. In this example, the converting means 6 may be implemented by an integrated circuit, such as a microcontroller (e.g., MSP430 microcontroller, PIC microcontroller, etc.). Also in this exemplary embodiment, the reference voltage sources may be inherent reference voltage sources in the converting means (e.g., a microcontroller) such that the reference voltages generated by the reference voltage sources are not set but may be selected by the reference voltage selection means 4.

Figure 3:
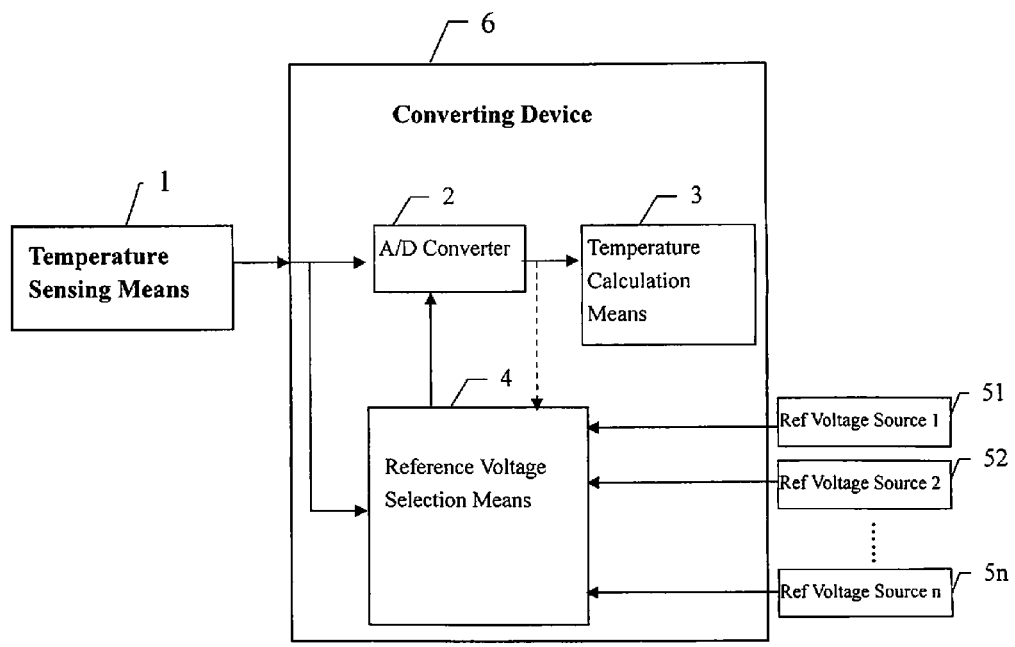
FIG. 3 is a block diagram which schematically illustrates the structure of a temperature measuring device according to yet another exemplary embodiment.

FIG. 3 illustrates an exemplary embodiment in which the reference voltage selection means 4, the A/D converter 2, and the temperature calculation means 3 may be integrated into a converting means or device 6. In this example, the at least two reference voltage sources 51, 52, . . . , 5*n* are all located or provided outside the converting means 6. The converting means 6 may be implemented by an integrated circuit, such as a microcontroller (e.g., MSP430 microcontroller, PIC microcontroller, etc.).

Figure 4:
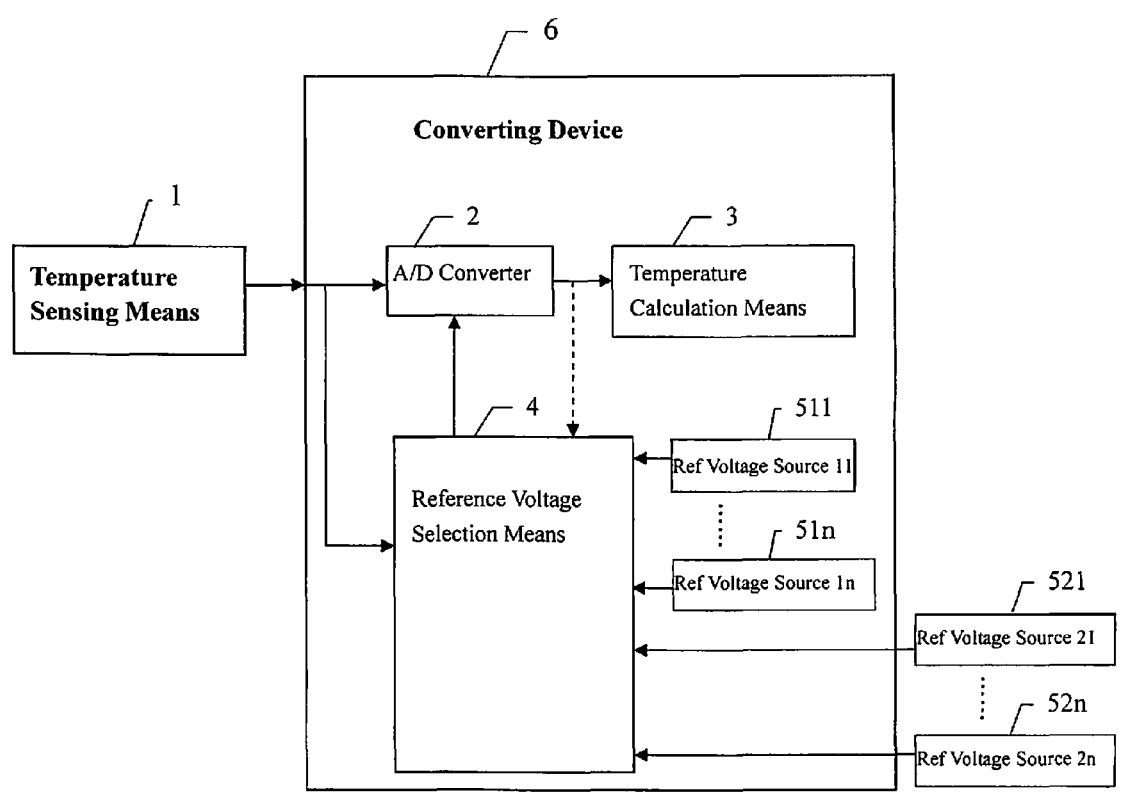
FIG. 4 is a block diagram which schematically illustrates the structure of a temperature measuring device according to a further exemplary embodiment.

FIG. 4 illustrates an exemplary embodiment in which at least one of the at least two reference voltage sources 511, . . . , 51*n*, the reference voltage selection means 4, the A/D converter 2, and the temperature calculation means 3 may be integrated into a converting means or device 6. The remaining reference voltage sources 521, . . . , 52*n*, are located or provided outside the converting means 6. The converting means 6 may be implemented by an integrated circuit, such as a microcontroller (e.g., MSP430 microcontroller, PIC microcontroller, etc.).

A description will be provided of an exemplary process by which an exemplary embodiment of a temperature measuring device may be used for measuring temperature. In this example process, a temperature sensor (e.g., a thermistor, etc.) converts a temperature value into a resistor value. The resistor value is converted into a voltage value by signal processing and output means (e.g., a voltage division circuit, etc.). An analog-to-digital (A/D) converter senses and converts the voltage value into a digital value according to a selected voltage reference. A microcontroller uses the digital value to complete the temperature calculation. By way of further example only, a 2 voltage reference example will be described. In this example, the A/D converter uses first voltage reference (e.g., 2.5V, etc.) to measure voltage, if the microcontroller finds the input voltage is higher than a predetermined proportion (e.g., 50%, etc.) of the first voltage reference, the first voltage reference will be used continuously. If the microcontroller finds the input voltage is less than the predetermined proportion of the first voltage reference (at this time, the temperature resolution will have become poor because of nonlinearity), the microcontroller alters or switches from the first voltage reference to the second voltage reference (e.g., 1.5V, etc.). The input voltage may then be about 83% of the second voltage reference after alteration as compared with 50% of the first voltage reference (1.25/1.5), such that the temperature resolution would be improved. If the microcontroller finds the input voltage is less than a second predetermined proportion (e.g., 90%, etc.) of the second voltage reference, the second voltage reference will be used continuously. If the microcontroller finds the input voltage is higher than second predetermined portion of the second voltage reference, the microcontroller will alter or switch from the second voltage reference to the first voltage reference.

An exemplary embodiment of a temperature measuring device includes means for converting a sensed temperature to an analog signal, such as temperature sensing means 1 shown in the figures and described above (e.g., temperature sensor, thermistor, voltage divider circuit, etc.). The temperature measuring device also includes means for selecting one reference voltage source from at least two reference voltage sources to generate a reference voltage output, such as the reference voltage selection means 4 shown in the figures and described above (e.g., comparator, integrated circuit, microcontroller, etc.). The temperature measuring device further includes means for converting the analog signal to a digital signal based on the reference voltage output, such as the A/D converter 2 shown in the figures and described above (e.g., integrated circuit, microcontroller, etc.). The temperature measuring device also includes means for calculating a temperature to be measured based on the digital signal, such as the temperature calculation means 3 shown in the figures and described above (e.g., hardware or software using a map table in a microcontroller or a formula to calculate the temperature, etc.). As disclosed herein, hardware and/or software may be used for the various means of the temperature measuring device. In an exemplary embodiment, the temperature measuring device includes a microcontroller that includes the means for selecting one reference voltage source, the means for converting the analog signal to a digital signal, and the means for calculating a temperature.

Also disclosed herein are exemplary methods relating to measuring temperature or temperature measurement. In an exemplary embodiment, a method generally includes converting a sensed temperature to an analog signal, selecting one reference voltage source from at least two reference voltage sources to generate a reference voltage output, converting the analog signal to a digital signal based on the reference voltage output, and calculating a temperature to be measured based on the digital signal. In this example method, each of the at least two reference voltage sources generates a reference voltage different from a reference voltage generated by any other reference voltage source. The method may include selecting the one reference voltage source based on the voltage of the analog signal and the reference voltages generated by the at least two reference voltage sources. Additionally, or alternatively, the method may include selecting the one reference voltage source based on the value represented by the digital signal. In an exemplary embodiment, the step, operation or process of converting a sensed temperature to an analog signal includes converting a temperature value into a resistor value and converting the resistor value into a voltage value. In this example, the step, operation or process of converting the analog signal to a digital signal includes converting the voltage value into the digital value.

Accordingly, the inventors hereof have disclosed exemplary embodiments of temperature measuring devices or means, which may have a fast measuring speed because of utilizing A/D converter. By providing at least two reference voltages for the A/D converter, and selecting a corresponding reference voltage according to the input voltage or the output digital signal of the A/D converter, the inventors have improved the resolution of the A/D converter, and thus the resolution of the temperature measuring device is improved. Therefore, the temperature measuring device implemented based in accordance with the inventors' disclosure may keep a high temperature resolution in a relatively wide measurement range. By way of example only, an exemplary embodiment of a temperature device may have a range of 0° F. to 120° F. and achieve 1/16° F. temperature resolution by altering different voltage reference for the A/D converter.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms (e.g., different materials may be used, etc.) and that neither should be construed to limit the scope of the disclosure. In some example embodiments, well-known processes, well-known device structures, and well-known technologies are not described in detail. In addition, the drawings are to be regarded as being schematic representations only. Functional blocks or units illustratively shown in the drawings are not to be construed as indicating that those units necessarily are implemented as physically separate units. Rather, functional blocks or units shown or described may be implemented as separate units or may be combined into integrated units.

Functional units may be implemented by hardware, software, or a combination thereof. Aspects of the present disclosure may also be used for improving resolution of other physical quantity measurements such as humidity, pressure, gas concentration, etc.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A temperature measuring device, comprising:
   a temperature sensing means;
   at least two reference voltage sources;
   a reference voltage selection means operable for selecting one reference voltage source from the at least two reference voltage sources to generate a reference voltage output;
   an analog-to-digital (A/D) converter operable for converting an analog signal output by the temperature sensing means to a digital signal based on the reference voltage output; and
   a temperature calculation means for calculating a temperature to be measured based on the digital signal output by the A/D converter.

2. The temperature measuring device of claim 1, wherein each of the at least two reference voltage sources generates a reference voltage different from a reference voltage generated by any other reference voltage source.

3. The temperature measuring device of claim 1, wherein the reference voltage selection means selects the one reference voltage source based on the analog signal that is output by the temperature sensing means.

4. The temperature measuring device of claim 3, wherein the reference voltage selection means selects the one reference voltage source based on the voltage of the analog signal.

5. The temperature measuring device of claim 4, wherein the reference voltage selection means selects the one reference voltage source based on the relationship between the voltage of the analog signal and the reference voltages generated by the at least two reference voltage sources.

6. The temperature measuring device of claim 1, wherein the reference voltage selection means selects the one reference voltage source based on the digital signal output by the A/D converter.

7. The temperature measuring device of claim 6, wherein the reference voltage selection means selects the one reference voltage source based on the value represented by the digital signal.

8. The temperature measuring device of claim 1, wherein the reference voltage selection means, the A/D converter, and the temperature calculation means are integrated into a converting device.

9. The temperature measuring device of clam 8, wherein:
at least one of the at least two reference voltage sources are also integrated into the converting device; or
each of the at least two reference voltage sources is also integrated into a converting device; and/or
the converting device comprises an integrated circuit.

10. The temperature measuring device of claim 1, wherein:
the temperature sensing means includes a temperature sensor and a signal processing and output means connected with the temperature sensor; and
an output port of the signal processing and output means is connected to an input port of the A/D converter.

11. The temperature measuring device of claim 10, wherein:
the temperature sensor comprises a thermistor; and/or
the signal processing and output means comprises a voltage division circuit.

12. The temperature measuring device of claim 1, wherein:
the reference voltage selection means comprises a comparator; and/or
the A/D converter comprises a successive-approximation ADC, a delta-encoded ADC, or a sigma-delta converter; and/or
the temperature sensing means includes a thermistor and a voltage division circuit connected with the thermistor and with an input port of the A/D converter; and/or
the temperature calculation means is connected to an output port of the A/D converter, the temperature calculation means including a map table in a microcontroller to map the digital signal output by the A/D converter into a value of the temperature.

13. The temperature measuring device of claim 1, wherein the temperature sensing means is operable for sensing the temperature and converting the sensed temperature to a corresponding analog signal.

14. The temperature measuring device of claim 1, wherein the reference voltage selection means is further operable to switch between reference voltages of the at least two reference voltage sources, based on the analog signal that is output by the temperature sensing means and/or the digital signal that is output by the A/D converter, to generate the reference voltage output.

15. A temperature measuring device comprising:
means for converting a sensed temperature to an analog signal;
means for selecting one reference voltage source from at least two reference voltage sources to generate a reference voltage output;
means for converting the analog signal to a digital signal based on the reference voltage output; and
means for calculating a temperature to be measured based on the digital signal.

16. The temperature measuring device of claim 15:
wherein the means for converting a sensed temperature to an analog signal comprises:
a temperature sensor operable for sensing a temperature and converting a sensed temperature value into a resistor value; and
a circuit operable for converting the resistor value to a voltage value;
wherein the means for converting the analog signal to a digital signal comprises an analog-to-digital converter operable for converting the voltage value to the digital signal.

17. The temperature measuring device of claim 15, comprising a microcontroller that includes said means for selecting one reference voltage source, said means for converting the analog signal to a digital signal, and said means for calculating a temperature.

18. A method relating to measuring temperature comprising:
converting a sensed temperature to an analog signal;
selecting one reference voltage source from at least two reference voltage sources to generate a reference voltage output;
converting the analog signal to a digital signal based on the reference voltage output; and
calculating a temperature to be measured based on the digital signal.

19. The method of claim 18, wherein:
each of the at least two reference voltage sources generates a reference voltage different from a reference voltage generated by any other reference voltage source; and
selecting one reference voltage source comprises selecting the one reference voltage source based on the voltage of the analog signal and the reference voltages generated by the at least two reference voltage sources.

20. The method of claim 18, wherein:
each of the at least two reference voltage sources generates a reference voltage different from a reference voltage generated by any other reference voltage source; and
selecting one reference voltage source comprises selecting the one reference voltage source based on the value represented by the digital signal.

21. The method of claim 18, wherein
converting a sensed temperature to an analog signal comprises converting a temperature value into a resistor value and converting the resistor value into a voltage value; and
converting the analog signal to a digital signal comprises converting the voltage value into the digital value.

22. The method of claim 18, further comprising switching between reference voltage sources of the at least two reference voltage sources, based on the analog signal that is output by the temperature sensing means and/or the digital signal that is output by the A/D converter, to generate the reference voltage output.

* * * * *